R. J. FLEISCHER.
STORAGE BATTERY ATTACHMENT.
APPLICATION FILED JULY 5, 1907.
907,487.
Patented Dec. 22, 1908.
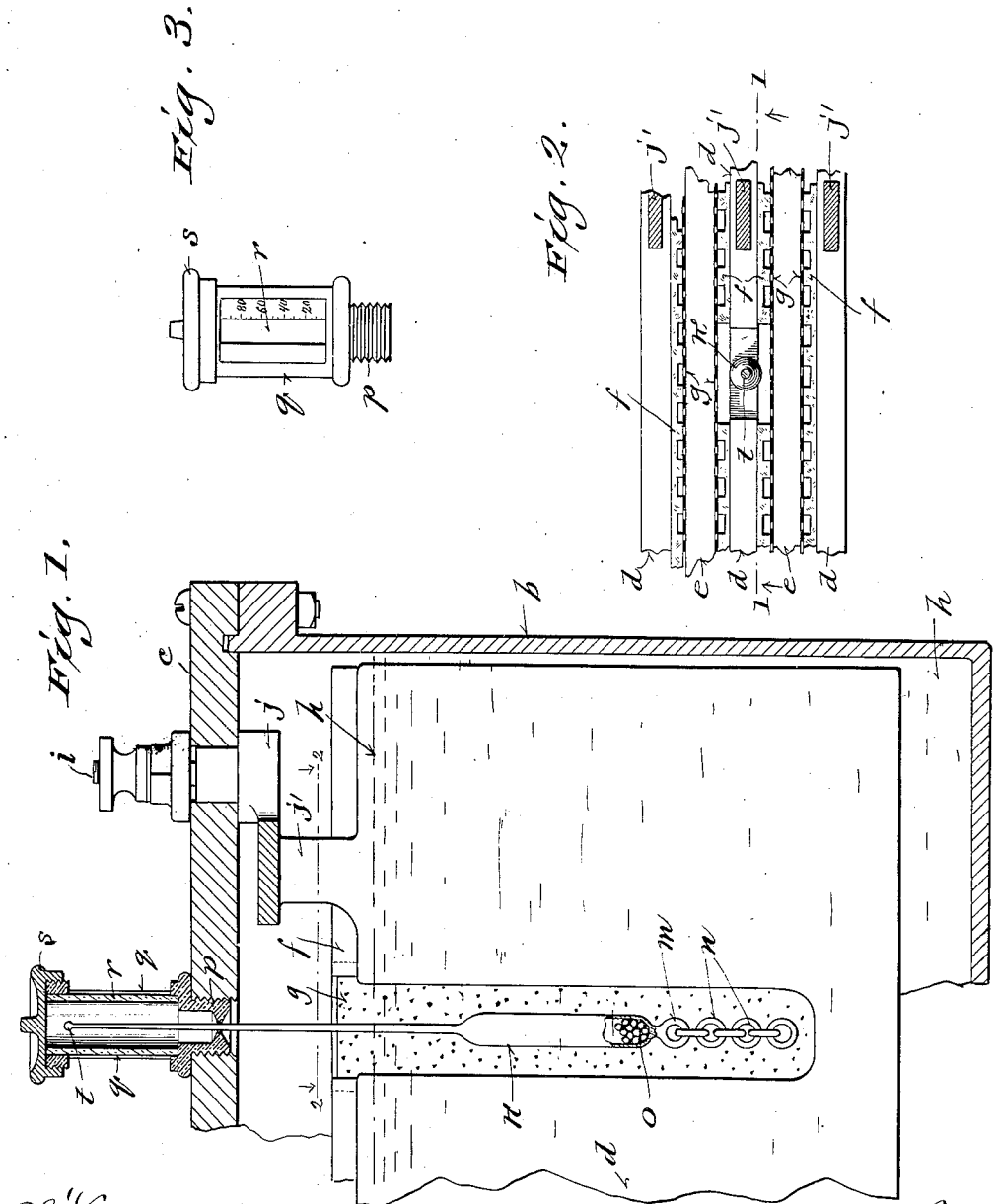

UNITED STATES PATENT OFFICE.

RICHARD J. FLEISCHER, OF MILWAUKEE, WISCONSIN.

STORAGE-BATTERY ATTACHMENT.

No. 907,487.

Specification of Letters Patent.

Patented Dec. 22, 1908.

Application filed July 5, 1907. Serial No. 382,209.

*To all whom it may concern:*

Be it known that I, RICHARD J. FLEISCHER, a citizen of the United States, and resident of Milwaukee, in the county of Milwaukee and State of Wisconsin, have invented certain new and useful Improvements in Storage-Battery Attachments; and I do hereby declare that the following is a full, clear, and exact description thereof.

The object of the invention is to provide simple, economical and efficient attachments applicable to storage-batteries to indicate at all times and under all conditions the percentage or degree of charge therein, said invention consisting in what is herein shown, described and claimed. Figure 1 of the drawings represents a sectional view of a fragment of a storage-battery provided with an indicator in accordance with my invention, the plane of the section being indicated by line 1—1 in Fig. 2; Fig. 2, a plan view of a fragment of a cell of the battery partly in horizontal section on the plane indicated by line 2—2 in Fig. 1, and Fig. 3, a side elevation of the gage portion of the indicator.

Referring by letter to the drawings, $b$ indicates the jar, $c$ its cover, $d$, $e$, electrodes and $f$, $g$, insulation of a cell, $h$ the submerging fluid, $i$ a binding-post and $j$ a binding-post plate of a liquid-tight storage-battery, said plate being in union with shanks $j'$ of electrodes.

The battery-cell is vertically recessed to provide for the immersion of a weighted hydrometer $k$, in the liquid of the battery, and the bulb-end of the hydrometer terminates at the bottom in an eye-shank $m$ to which a chain $n$ of a suitable number of links is attached. The hydrometer and the chain are of acid-proof material. The hydrometer is suitably weighted, preferably with shot $o$, in proportion to the specific gravity of the immersing fluid so as to properly float itself and the chain in connection therewith when the battery is charged to its full capacity.

The elongated stem of the hydrometer is guided in a central bottom aperture of the shank $p$ of a cylindrical shell $q$ of insulating material, preferably hard-rubber, for which a glass tube $r$ serves as a lining. The shank $p$ of the shell $q$ has screw-thread engagement with an aperture in the battery-jar cover and it is preferable to have the upper end of said shell in the form of a screw-cap $s$ as herein shown. The shell is also fashioned to provide vertical side slots through which to expose the glass lining $r$ and the preferably distinctively colored upper knob-terminal $t$ of the hydrometer. A scale is provided on the shell $q$ parallel to each slot therein and preferably indexed at intervals thereof as herein shown, this scale being a per-cent measure of the charge capacity of the battery or a cell of same.

The battery being fully charged, the hydrometer is floated, as aforesaid, to indicate 100%, and as the specific gravity of the immersing liquid in said battery decreases, due to utilization of the current, there is a corresponding descent of the hydrometer, whereby the proportionately decreased per-cent of the charge in the aforesaid battery is indicated, the links of the chain $n$ being successively piled upon the bottom of the recess in the adjacent electrode to gradually decrease the weight of said chain upon said hydrometer. Hence by observing the gage portion of the indicator, at any time, the percentage of charge in the battery can be readily determined. The aforesaid chain compensates for the commotion in the battery due to the working of same, whereby stability is imparted to the hydrometer to keep the same in fixed position until influenced by a change of specific gravity in the electrolyte or fluid. This chain does not impair the utility of the hydrometer, and without said chain said hydrometer would be kept constantly on a quiver vertically because of the action of the gases in the battery. The battery starting at a predetermined specific gravity, the hydrometer is full down in the electrolyte and the chain collapsed. As the specific gravity increases, the hydrometer is proportionately floated, thereby lifting links of the chain in the same proportion and registering on the scale until the range of said scale is completed, all of said chain being then pendent.

I claim:

1. A storage-battery, a weighted hydrometer partly immersed in the liquid contents of the battery, a stem of this hydrometer being projected through an opening in the battery-cover, a transparent gage-shell fitted in said battery-cover opening to inclose the upper portion of the hydrometer-stem, and a chain attached to the lower bulb-end of the hydrometer, the chain being collapsed when said hydrometer is full down in the electrolyte of said battery.

2. A storage-battery, a weighted hydrometer partly immersed in the liquid-contents of the battery, a stem of this hydrometer being projected through an opening in the battery-cover, a chain attached to the lower bulb-end of said hydrometer, and a vertically slotted gage-shell provided with a transparent lining and fitted in said battery-cover opening to inclose the upper portion of the hydrometer-stem.

3. A storage-battery charge-indicator comprising a glass-lined vertical shell having a shank for screw-thread engagement with an aperture in the battery-cover, a vertical slot, and a scale parallel to the slot; and a weighted hydrometer for immersion in the liquid of the battery in position to have its elongated stem engage a central guide aperture in the shell-shank bottom, said stem being visible through the shell-slot.

4. A storage-battery having an element of a cell thereof vertically recessed, and a charge-indicator comprising a weighted hydrometer for immersion in the recess portion of said element and a transparent gage-shell attachable to the battery-cover to inclose the elongated stem of the hydrometer.

5. A storage-battery having an element of a cell thereof vertically recessed, a weighted hydrometer partly submerged in the recessed portion of said element, a stem of this hydrometer being projected through an opening in the battery-cover, a chain attached to the lower bulb-end of said hydrometer, a vertically slotted gage-shell provided with a transparent lining and fitted in said battery-cover opening to inclose the upper portion of the hydrometer-stem.

In testimony that I claim the foregoing I have hereunto set my hand at Milwaukee in the county of Milwaukee and State of Wisconsin in the presence of two witnesses.

RICH. J. FLEISCHER.

Witnesses:
N. E. OLIPHANT,
GEORGE FELBER.